(12) United States Patent
Buttolo et al.

(10) Patent No.: US 9,914,418 B2
(45) Date of Patent: Mar. 13, 2018

(54) IN-VEHICLE CONTROL LOCATION

(71) Applicant: Ford Global Technologies, LLC, Dearborn, MI (US)

(72) Inventors: Pietro Buttolo, Dearborn Heights, MI (US); Stuart C. Salter, White Lake, MI (US); James Stewart Rankin, II, Novi, MI (US); Stephen Ronald Tokish, Sylvania, OH (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/842,025

(22) Filed: Sep. 1, 2015

(65) Prior Publication Data

US 2017/0057437 A1    Mar. 2, 2017

(51) Int. Cl.
G05D 3/00 (2006.01)
G05D 1/00 (2006.01)
B60R 16/037 (2006.01)

(52) U.S. Cl.
CPC .................. *B60R 16/037* (2013.01)

(58) Field of Classification Search
CPC .................................................... B60R 16/037
See application file for complete search history.

(56) References Cited

U.S. PATENT DOCUMENTS

| | | |
|---|---|---|
| 4,721,954 A | 1/1988 | Mauch |
| 4,792,783 A | 12/1988 | Burgess et al. |
| 4,962,302 A * | 10/1990 | Katsumi ............ B60H 1/00842 165/202 |
| 5,132,880 A | 7/1992 | Kawamura |
| 5,143,437 A * | 9/1992 | Matsuno .................. B60Q 3/80 315/156 |
| 5,255,442 A | 10/1993 | Schierbeek et al. |
| 5,543,591 A | 8/1996 | Gillespie et al. |

(Continued)

FOREIGN PATENT DOCUMENTS

| | | |
|---|---|---|
| CN | 102445954 B | 3/2014 |
| CN | 103942963 A | 7/2014 |

(Continued)

OTHER PUBLICATIONS

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006_gto_owners.pdf.

(Continued)

*Primary Examiner* — Bhavesh V Amin
(74) *Attorney, Agent, or Firm* — Jennifer M. Stec; Brooks Kushman P.C.

(57) ABSTRACT

Zones may be associated with respective seating positions of a vehicle. In-vehicle components may also be associated with at least one of the zones of the vehicle. A processor may locate a personal device as being within one of the zones; identify notification settings of the personal device; and invoke notification devices of the in-vehicle components associated with the zone when the notification settings indicate that the personal device has not been previously located in the zone. Invoking the notification devices may include invoking at least one of backlights of the in-vehicle components or existing lighting elements of the in-vehicle component.

20 Claims, 6 Drawing Sheets

(56) References Cited

U.S. PATENT DOCUMENTS

| | | | |
|---|---|---|---|
| 5,648,656 A * | 7/1997 | Begemann | H05B 39/042 |
| | | | 160/5 |
| 5,650,929 A | 7/1997 | Potter et al. | |
| 5,697,844 A | 12/1997 | Von Kohorn | |
| 5,757,268 A | 5/1998 | Toffolo et al. | |
| 5,796,179 A | 8/1998 | Honaga | |
| 5,848,634 A | 12/1998 | Will et al. | |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 * | 3/2003 | Hein | B60Q 1/323 |
| | | | 116/28.1 |
| 6,935,763 B2 * | 8/2005 | Mueller | B60H 1/00985 |
| | | | 362/230 |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,706,740 B2 | 4/2010 | Collins et al. | |
| 7,778,651 B2 | 8/2010 | Billhartz | |
| 7,800,483 B2 * | 9/2010 | Bucher | B60Q 3/80 |
| | | | 340/425.5 |
| 7,810,969 B2 * | 10/2010 | Blackmore | B60N 2/4686 |
| | | | 362/459 |
| 7,973,773 B2 | 7/2011 | Pryor | |
| 8,065,169 B1 | 11/2011 | Oldham et al. | |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 * | 4/2013 | Wilson | B60Q 3/68 |
| | | | 362/496 |
| 8,417,258 B2 | 4/2013 | Barnes, Jr. | |
| 8,421,589 B2 | 4/2013 | Sultan et al. | |
| 8,447,598 B2 | 5/2013 | Chutorash et al. | |
| 8,476,832 B2 * | 7/2013 | Prodin | B60Q 3/80 |
| | | | 315/77 |
| 8,482,430 B2 * | 7/2013 | Szczerba | G01C 21/3626 |
| | | | 340/435 |
| 8,797,295 B2 | 8/2014 | Bernstein et al. | |
| 8,823,517 B2 | 9/2014 | Hadsall, Sr. | |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 | 11/2014 | Dobyns | |
| 8,930,045 B2 | 1/2015 | Oman et al. | |
| 8,947,202 B2 | 2/2015 | Tucker et al. | |
| 9,053,516 B2 | 6/2015 | Stempora | |
| 9,078,200 B2 | 7/2015 | Wuergler et al. | |
| 9,104,537 B1 | 8/2015 | Penilla et al. | |
| 9,164,588 B1 | 10/2015 | Johnson et al. | |
| 9,288,270 B1 | 3/2016 | Penilla et al. | |
| 9,350,809 B2 | 5/2016 | Leppanen | |
| 9,357,054 B1 | 5/2016 | Froment et al. | |
| 9,417,691 B2 | 8/2016 | Belimpasakis et al. | |
| 2002/0069002 A1 * | 6/2002 | Morehouse | B60R 16/037 |
| | | | 701/29.6 |
| 2002/0070923 A1 | 6/2002 | Levy et al. | |
| 2002/0087423 A1 | 7/2002 | Carbrey Palango et al. | |
| 2002/0092019 A1 | 7/2002 | Marcus | |
| 2002/0096572 A1 * | 7/2002 | Chene | B60H 1/00642 |
| | | | 236/62 |
| 2002/0178385 A1 | 11/2002 | Dent et al. | |
| 2002/0197976 A1 * | 12/2002 | Liu | B60R 16/037 |
| | | | 455/352 |
| 2003/0078709 A1 * | 4/2003 | Yester | B60R 16/037 |
| | | | 701/36 |
| 2003/0171863 A1 * | 9/2003 | Plumeier | B60N 2/0224 |
| | | | 701/33.4 |
| 2004/0034455 A1 | 2/2004 | Simonds et al. | |
| 2004/0076015 A1 | 4/2004 | Aoki et al. | |
| 2004/0141634 A1 | 7/2004 | Yamamoto et al. | |
| 2004/0215532 A1 | 10/2004 | Boman et al. | |
| 2005/0040933 A1 | 2/2005 | Huntzicker | |
| 2005/0044906 A1 | 3/2005 | Spielman | |
| 2005/0099320 A1 | 5/2005 | Nath et al. | |
| 2005/0136845 A1 | 6/2005 | Masouka et al. | |
| 2005/0185399 A1 * | 8/2005 | Beermann | B64D 11/00 |
| | | | 362/231 |
| 2005/0261807 A1 * | 11/2005 | Sorensen | B60N 2/002 |
| | | | 701/2 |
| 2005/0261815 A1 * | 11/2005 | Cowelchuk | B60R 16/037 |
| | | | 701/36 |
| 2005/0288837 A1 * | 12/2005 | Wiegand | B60R 16/037 |
| | | | 701/36 |
| 2006/0075934 A1 | 4/2006 | Ram | |
| 2006/0089755 A1 * | 4/2006 | Ampunan | B60R 16/037 |
| | | | 701/1 |
| 2006/0155429 A1 | 7/2006 | Boone et al. | |
| 2006/0155547 A1 | 7/2006 | Browne et al. | |
| 2006/0205456 A1 | 9/2006 | Bentz et al. | |
| 2006/0250217 A1 | 11/2006 | Hamling et al. | |
| 2006/0258377 A1 * | 11/2006 | Economos | H04L 12/189 |
| | | | 455/461 |
| 2006/0271261 A1 * | 11/2006 | Flores | B60Q 9/008 |
| | | | 701/49 |
| 2007/0021885 A1 * | 1/2007 | Soehren | B60R 16/037 |
| | | | 701/36 |
| 2007/0140187 A1 | 6/2007 | Rokusek et al. | |
| 2007/0180503 A1 | 8/2007 | Li et al. | |
| 2007/0198472 A1 | 8/2007 | Simonds et al. | |
| 2007/0201389 A1 | 8/2007 | Murayama | |
| 2007/0262140 A1 | 11/2007 | Long, Sr. | |
| 2008/0140868 A1 | 6/2008 | Kalayjian et al. | |
| 2008/0180231 A1 | 7/2008 | Chen | |
| 2008/0261643 A1 | 10/2008 | Bauer et al. | |
| 2008/0288406 A1 * | 11/2008 | Seguin | G06Q 30/02 |
| | | | 705/50 |
| 2009/0249081 A1 | 10/2009 | Zayas | |
| 2009/0253439 A1 | 10/2009 | Gantner et al. | |
| 2010/0091394 A1 | 4/2010 | DeWind et al. | |
| 2010/0171696 A1 | 7/2010 | Wu | |
| 2010/0176917 A1 | 7/2010 | Bacarella | |
| 2010/0197359 A1 | 8/2010 | Harris | |
| 2010/0216401 A1 | 8/2010 | Kitahara | |
| 2010/0222939 A1 * | 9/2010 | Namburu | G07C 9/00111 |
| | | | 701/2 |
| 2010/0225443 A1 | 9/2010 | Bayram et al. | |
| 2010/0231958 A1 | 9/2010 | Okigami | |
| 2010/0233957 A1 * | 9/2010 | Dobosz | B60R 16/037 |
| | | | 455/41.1 |
| 2010/0235045 A1 | 9/2010 | Craig et al. | |
| 2010/0280711 A1 * | 11/2010 | Chen | B60R 16/037 |
| | | | 701/36 |
| 2010/0315373 A1 | 12/2010 | Steinhauser et al. | |
| 2011/0086668 A1 | 4/2011 | Patel | |
| 2011/0137520 A1 * | 6/2011 | Rector | H04M 1/72577 |
| | | | 701/36 |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2012/0006611 A1 | 1/2012 | Wallace et al. | |
| 2012/0032899 A1 | 2/2012 | Waeller et al. | |
| 2012/0065815 A1 | 3/2012 | Hess | |
| 2012/0096908 A1 | 4/2012 | Fuse | |
| 2012/0098768 A1 | 4/2012 | Bendewald et al. | |
| 2012/0109451 A1 | 5/2012 | Tan | |
| 2012/0136802 A1 | 5/2012 | McQuade et al. | |
| 2012/0154114 A1 | 6/2012 | Kawamura | |
| 2012/0214463 A1 | 8/2012 | Smith et al. | |
| 2012/0214471 A1 | 8/2012 | Tadayon et al. | |
| 2012/0229253 A1 | 9/2012 | Kolar | |
| 2012/0244883 A1 | 9/2012 | Tibbitts et al. | |

(56) References Cited

U.S. PATENT DOCUMENTS

| | | |
|---|---|---|
| 2012/0254809 A1 | 10/2012 | Yang et al. |
| 2012/0268235 A1 | 10/2012 | Farhan et al. |
| 2012/0268242 A1 | 10/2012 | Tieman et al. |
| 2013/0015951 A1 | 1/2013 | Kuramochi et al. |
| 2013/0037252 A1 | 2/2013 | Major et al. |
| 2013/0079951 A1 | 3/2013 | Brickman |
| 2013/0099892 A1 | 4/2013 | Tucker et al. |
| 2013/0116012 A1 | 5/2013 | Okayasu |
| 2013/0218371 A1 | 8/2013 | Simard et al. |
| 2013/0227647 A1 | 8/2013 | Thomas et al. |
| 2013/0259232 A1 | 10/2013 | Petel |
| 2013/0261871 A1 | 10/2013 | Hobbs et al. |
| 2013/0283202 A1 | 10/2013 | Zhou et al. |
| 2013/0295908 A1 | 11/2013 | Zeinstra et al. |
| 2013/0300608 A1 | 11/2013 | Margalef et al. |
| 2013/0329111 A1 | 12/2013 | Desai et al. |
| 2013/0335222 A1 | 12/2013 | Comerford et al. |
| 2013/0342379 A1 | 12/2013 | Bauman et al. |
| 2014/0043152 A1 | 2/2014 | Lippman et al. |
| 2014/0068713 A1 | 3/2014 | Nicholson et al. |
| 2014/0121883 A1 | 5/2014 | Shen et al. |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0279744 A1 | 9/2014 | Evans |
| 2014/0309806 A1 | 10/2014 | Ricci |
| 2014/0321321 A1 | 10/2014 | Knaappila |
| 2014/0335902 A1 | 11/2014 | Guba et al. |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0126171 A1 | 5/2015 | Miller et al. |
| 2015/0147974 A1 | 5/2015 | Tucker et al. |
| 2015/0148990 A1 | 5/2015 | Patel |
| 2015/0149042 A1 | 5/2015 | Cooper et al. |
| 2015/0154531 A1 | 6/2015 | Skaaksrud |
| 2015/0172902 A1 | 6/2015 | Kasslin et al. |
| 2015/0178034 A1 | 6/2015 | Penilla et al. |
| 2015/0181014 A1 | 6/2015 | Gerhardt et al. |
| 2015/0204965 A1 | 7/2015 | Magarida et al. |
| 2015/0210287 A1 | 7/2015 | Penilla et al. |
| 2015/0223151 A1 | 8/2015 | Lei et al. |
| 2015/0256668 A1 | 9/2015 | Atkinson et al. |
| 2015/0261219 A1 | 9/2015 | Cuddihy et al. |
| 2015/0261573 A1 | 9/2015 | Rausch et al. |
| 2015/0269797 A1 | 9/2015 | Kauffmann et al. |
| 2015/0278164 A1 | 10/2015 | Kim et al. |
| 2015/0283914 A1 | 10/2015 | Malone |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0203661 A1 | 7/2016 | Pudar et al. |
| 2016/0214572 A1 | 7/2016 | Snider |
| 2016/0248905 A1 | 8/2016 | Miller et al. |
| 2016/0332535 A1 | 11/2016 | Bradley et al. |
| 2016/0360382 A1 | 12/2016 | Gross et al. |

FOREIGN PATENT DOCUMENTS

| | | |
|---|---|---|
| JP | 2011131833 A | 7/2011 |
| WO | 2013052043 A1 | 11/2013 |

OTHER PUBLICATIONS

Rasin, "An In/Vehicle Human/Machine Interface Module," XML Journal, Jan. 3, 2003, (9 pages), retrieved from http://xml.sys/con.com/node/40547 on Dec. 13, 2014.

Shahzada, "Touch Interaction for User Authentication," Thesis, Carleton University, Ottawa, Ontario, May 2014 (124 pages).

Napa SAE/BAE et al., "Biometric/Rich Gestures: A Novel Approach to Authentication on Multi/touch Devices," NYU/Poly, CHI 2012, May 5/10, 2012, Austin, TX (10 pages).

Goodwin, "Add/on module auto/unlocks your car when your phone is near," CNET, Car Tech, Nov. 19, 2013, http://www.cnet.com/news/add/on/module/auto/unlocks/your/car/when/your/phone/is/near (2 pages).

Klosowski, "Unlock Your Car with a Bluetooth Powered Keyless Entry System," Lifehacker, Sep. 30, 2013, http://lifehacker.com/unlock/your/car/with/a/bluetooth/powered/keyless/entry/1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010/toyota/prius/touch/tracer/display/.

Gahran, "Vehicle owner's manuals // now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en/us/specification/adopted/specifications. (2,772 pages).

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

\* cited by examiner

IN-VEHICLE CONTROL LOCATION

TECHNICAL FIELD

Aspects of the disclosure generally relate to locations of controls inside a vehicle.

BACKGROUND

Smartphone and wearable device sales volumes continue to increase. Thus, more such devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

SUMMARY

In a first illustrative embodiment, a system includes in-vehicle components, each associated with at least one zone associated with a respective seating position of a vehicle; and a processor programmed to locate a personal device as being within one of the zones; identify notification settings of the personal device; and invoke notification devices of the in-vehicle components associated with the zone when the notification settings indicate that the personal device has not been previously located in the zone.

In a second illustrative embodiment, a method includes locating a personal device within one of a plurality of zones defined as respective seating positions of a vehicle, each zone including at least one in-vehicle component; displaying a user interface to the personal device describing the in-vehicle components of the zone; receiving a notify request from the user interface; and invoking notification devices of at least one of the in-vehicle components of the zone responsive to the notify request.

In a third illustrative embodiment, a non-transitory computer-readable medium embodying instructions that, when executed by a processor, cause the processor to locate a personal device within one of a plurality of zones defined as respective seating positions of a vehicle, each zone including at least one in-vehicle component; identify notification settings of the personal device; and invoke notification devices of the in-vehicle components associated with the zone when the notification settings indicate that the personal device has not been previously located in the zone.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As smartphones, tablets, and other personal devices become more powerful and interconnected, there is an opportunity to integrate more intelligence and sensing into components of the vehicle interior. Traditional vehicle interior modules, such as reading lights or speakers, may be enhanced with a communication interface (such as Bluetooth Low Energy (BLE)). These enhanced modules of the vehicle interior may be referred to as in-vehicle components. The vehicle occupants may utilize their personal devices to control features of the in-vehicle components by connecting their personal devices to the in-vehicle components over the communications interface. In an example, a vehicle occupant may utilize an application installed to the personal device to turn the reading light on or off, or to adjust a volume of the speaker.

As ride sharing and ride pooling become more common, occupants of a vehicle may find themselves in unfamiliar vehicles. Because vehicle configurations vary, it may be unclear to a vehicle occupant what features are available and where they are located. The in-vehicle module framework may be used to help occupants to physically locate the in-vehicle components that are located within proximity to the seating locations of the vehicle occupants, or in other areas of the vehicle if desired. In an example, each of the in-vehicle components of the vehicle may include backlighting or other features that may be used to allow the vehicle occupants to identify the physical locations of the in-vehicle components that are associated with specific seating positions of the vehicle.

Figure 1A:
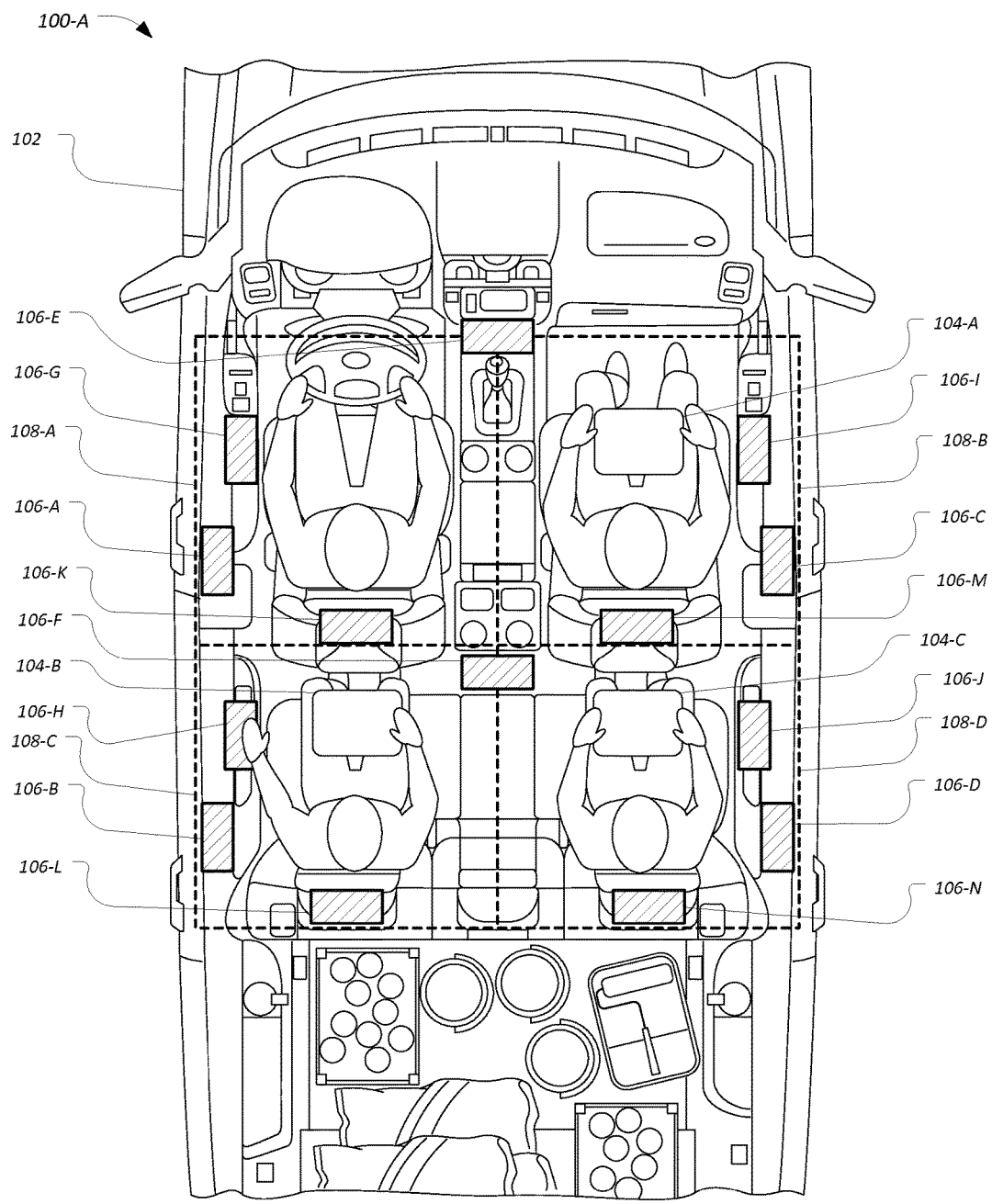
FIG. 1A illustrates an example system including a vehicle having a mesh of in-vehicle components configured to interact with vehicle occupant and user devices.

FIG. 1A illustrates an example system 100 including a vehicle 102 having a mesh of in-vehicle components 106 configured to interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by passenger-side rear may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
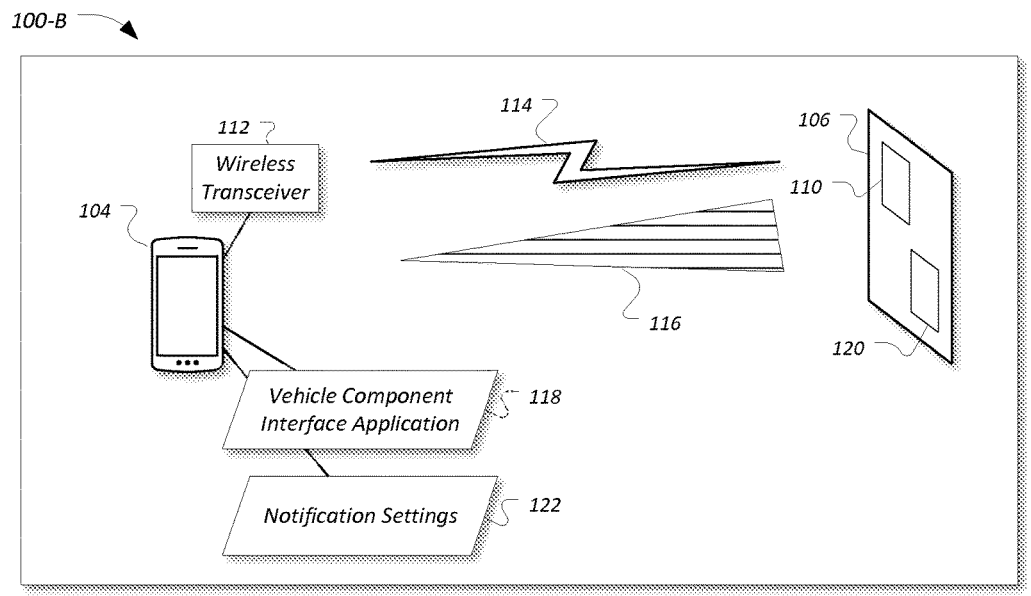
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a Bluetooth Low Energy transceiver configured to enable low energy Bluetooth signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a Bluetooth Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a head unit of the vehicle 102.

Each in-vehicle component 106 may also be equipped with a notification device 120 configured to facilitate identification of the physical location of the in-vehicle component 106 within the vehicle 102 by the occupants of the vehicle 102. In an example, the notification device 120 may be a backlight of the in-vehicle component 106. In another example, the notification device 120 may utilize other features of the controls of the set of controls of the in-vehicle component 106 to perform the notification, such as existing lighting elements of the in-vehicle component 106. In yet a further example, the notification device 120 may utilize audio chimes or other sounds emanating from the in-vehicle component 106 to aid in the location of the in-vehicle component 106. In an even further example, the notification device 120 may utilize haptic feedback devices or tactile feedback devices to provide a physical indication to a user (e.g., to a user's hand) of the particular location of the in-vehicle component 106. It should also be noted that these approached may be combined, and the notification device(s) 120 may perform more than one of the aforementioned or other notifications.

The system 100 may use one or more device location-tracking techniques to identify the zone 108 in which the personal device 104 is located. Location-tracking techniques may be classified depending on whether the estimate is based on proximity, angulation or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the RSSI signal strength 116 information available in the Bluetooth Low-Energy (BLE) protocol to infer the distance of a beacon from a personal device 104 (i.e. a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$
$$d_2^2 = (x-x_2)^2 + (y-y_2)^2 + (z-z_2)^2$$
$$d_2^3 = (x-x_3)^2 + (y-y_3)^2 + (z-z_3)^2 \quad (1)$$

Figure 1C:
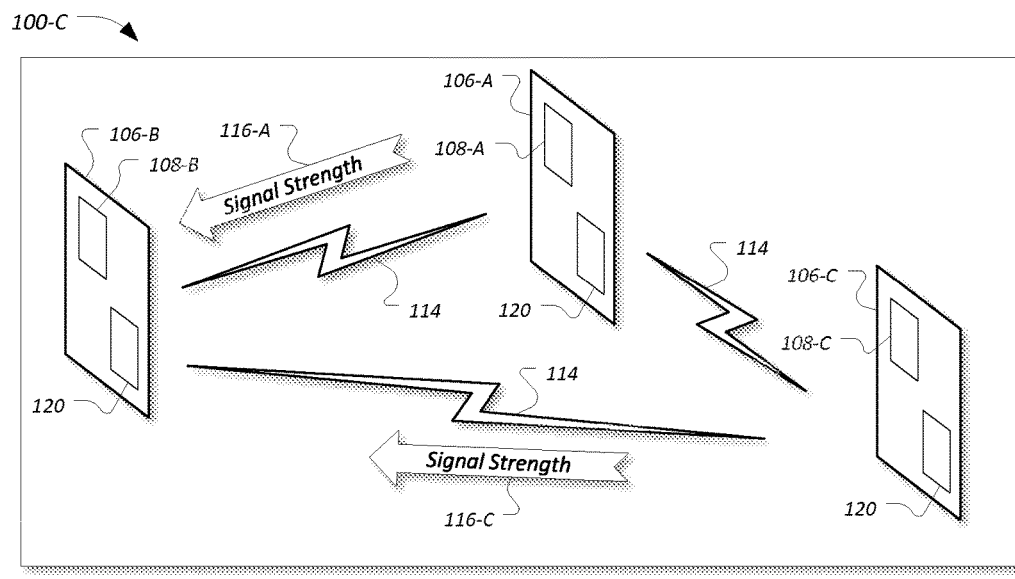
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104. As another possibility, the in-vehicle component 106 may identify the personal device 104 with the highest signal strength 116 at the in-vehicle component 106 as being the personal device 104 within the zone 108 as follows:

$$\text{Personal Device} = i \Rightarrow \max_{i=1,n} RSSI_i \quad (5)$$

Thus, the mesh of in-vehicle components 106 and the personal devices 104 may accordingly be utilized to allow the in-vehicle components 106 to identify in which zone 108 each personal device 104 is located.

As yet another possibility for locating of the personal device 104 within the vehicle 102, signal strengths 116 of the personal device 104 to each of the in-vehicle components 106 of a particular zone 108 may be used to determine whether the personal device 104 is located within that zone 108. As yet a further possibility for locating of the personal device 104 within the vehicle 102, symmetrical sets of in-vehicle components 106 with a symmetrical vehicle 102 cabin may be utilized to estimate the location of the personal device 104.

Regardless of the particular approach that is used, the mesh of in-vehicle components 106 and the personal devices 104 may be utilized to allow the in-vehicle components 106 to identify in which zone 108 each personal device 104 is located. As each of the in-vehicle components 106 is also associated with a zone 108, the in-vehicle components 106 may accordingly identify the personal device 104 to be notified as being the personal device 104 that is associated with the same zone 108 with which the in-vehicle component 106-H is associated. To continue the illustrated example, the vehicle component 106-H may utilize the mesh of in-vehicle components 106 to determine which of the personal devices 104 is the personal device 104 associated with the zone 108-C in which the vehicle component 106-H is located (i.e., personal device 104-B in the illustrated example).

As one possibility, the in-vehicle component 106-H may utilize signal strength 116 data received from the personal devices 104 in the vehicle 102 to identify which of the personal devices 104 is in use by the occupant physically interacting with the seating controls in-vehicle component 106-H. For instance, identifying the personal device 104 with the highest signal strength 116 at the in-vehicle component 106-H would likely identify the correct personal device 104-B, e.g., as follows:

$$\text{Personal Device} = i \Rightarrow \max_{i=1,n} RSSI_i \qquad (5)$$

Figure 2:
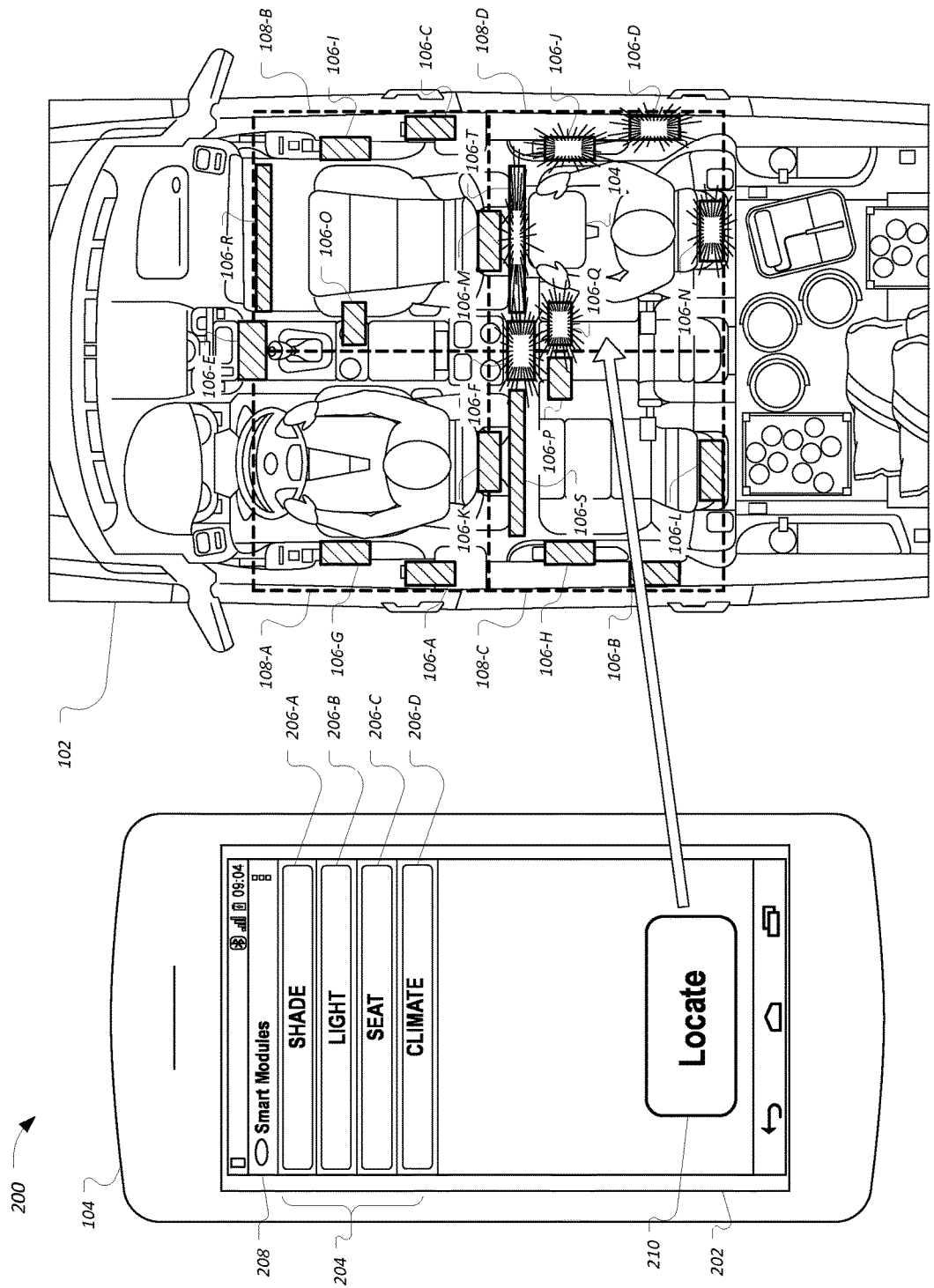
FIG. 2 illustrates an example diagram of the personal device of the occupant requesting backlighting of the in-vehicle components of the zone of the occupant using the vehicle component interface application.

FIG. 2 illustrates an example diagram 200 of backlighting of the in-vehicle components 106 of the zone 108 of the vehicle 102 in which the vehicle occupant is located using the vehicle component interface application 118. As shown, the diagram 200 illustrates an example user interface 202 of the vehicle component interface application 118 on a display of the personal device 104, as well as the vehicle 102 being controlled by the personal device 104. Similar to the vehicle 102 illustrated in FIG. 1A, the example vehicle in FIG. 2 includes a plurality of in-vehicle components 106. As shown, these in-vehicle components 106 include overhead light in-vehicle components 106-A through 106-D, climate control in-vehicle components 106-E and 106-F, seat control in-vehicle components 106-G through 106-J, speaker in-vehicle components 106-K through 106-N, keyboard in-vehicle components 106-O through 106-Q, and display screen in-vehicle components 106-R though 106-T.

As the occupant enters the vehicle 102 and settles into a zone 108 of the vehicle 102, the personal device 104 of the occupant may be detected by the in-vehicle components 106. For instance, the occupant may settle into the zone 108-D with the personal device 104 as shown. Based on a detection of the presence of wireless signals of the personal device 104, the in-vehicle components 106 may identify the zone 108 of the vehicle 102 in which the personal device 104 and accordingly the occupant is located. Once located, the in-vehicle components 106 may automatically enable the notification devices 120 of the in-vehicle components 106 of the zone 108 of the occupant. For instance, the notification devices 120 of the in-vehicle components 106-D, 106-F, 106-J, 106-N, 106-T, and 106-Q of the zone 108-D may be enabled to backlight the available controls of the zone 108-D. This could help the occupant become familiar with the newly-entered vehicle 102, by identifying to the occupant the set of available functionalities.

The notification devices 120 may be activated in accordance with notification settings 122 descriptive of the notification behavior desired for the notification devices 120. In an example, the notification settings 122 may be retrieved from storage of the personal device 104 as shown in the FIG. 1B. In other examples, the notification settings 122 may be stored by the in-vehicle components 106 or by another vehicle 102 component (e.g., a settings storage device, a telematics control unit, etc.) and retrieved by the in-vehicle components 106 for use in performing notifications. As one example, the notification settings 122 may specify a predetermined amount of time during which the notification devices 120 are activated. In some cases, the notification settings 122 may indicate for the notification to be performed the first time that a user enters a vehicle 102, while in other cases, the notification settings 122 may indicate for the notification to be performed each time the user enters a vehicle 102. The notification settings 122 may further indicate whether notification has already been performed a first time for the personal device 104 within the vehicle 102. In an example, the notification settings 122 may maintain vehicle identifiers of vehicle (e.g., VIN, etc.) for which the notification has already been performed, or vehicle identifiers and zones 108 of the vehicle 102 for which the notification has already been performed.

The notification devices 120 may also be expressly turned on or off on-demand from the vehicle component interface application 118. In an example, the user interface 202 of the vehicle component interface application 118 illustrating in-vehicle components 106 detected by the personal device 104. For instance, the user interface 202 may include a listing 204 configured to display selectable list entries 206-A through 206-D (collectively 206) indicative of the identified in-vehicle components 106. Each of the selectable list entries 206 may indicate a detected in-vehicle component 106 family available for configuration by the user (e.g., shade, light, seat control, and climate controls in-vehicle components 106 located within the zone 108 in which the personal device 104 of the user is located). The user interface 202 may also include a title label 208 to indicate to the user that the user interface 202 is displaying a menu of in-vehicle components 106 as detected by the vehicle component interface application 118.

As indicated in the diagram 200, the user interface 202 may further include a locate control 210 in the user interface 202 of the personal device 104 that, when selected, allows the occupant to selectively invoke the notification devices 120 of the in-vehicle components 106. Responsive to the selection, the notification devices 120 of the available in-vehicle components 106 of the passenger's zone 108 are activated. Accordingly, the available in-vehicle components 106 may be easily located on demand by the vehicle 102 occupant.

Figure 3:
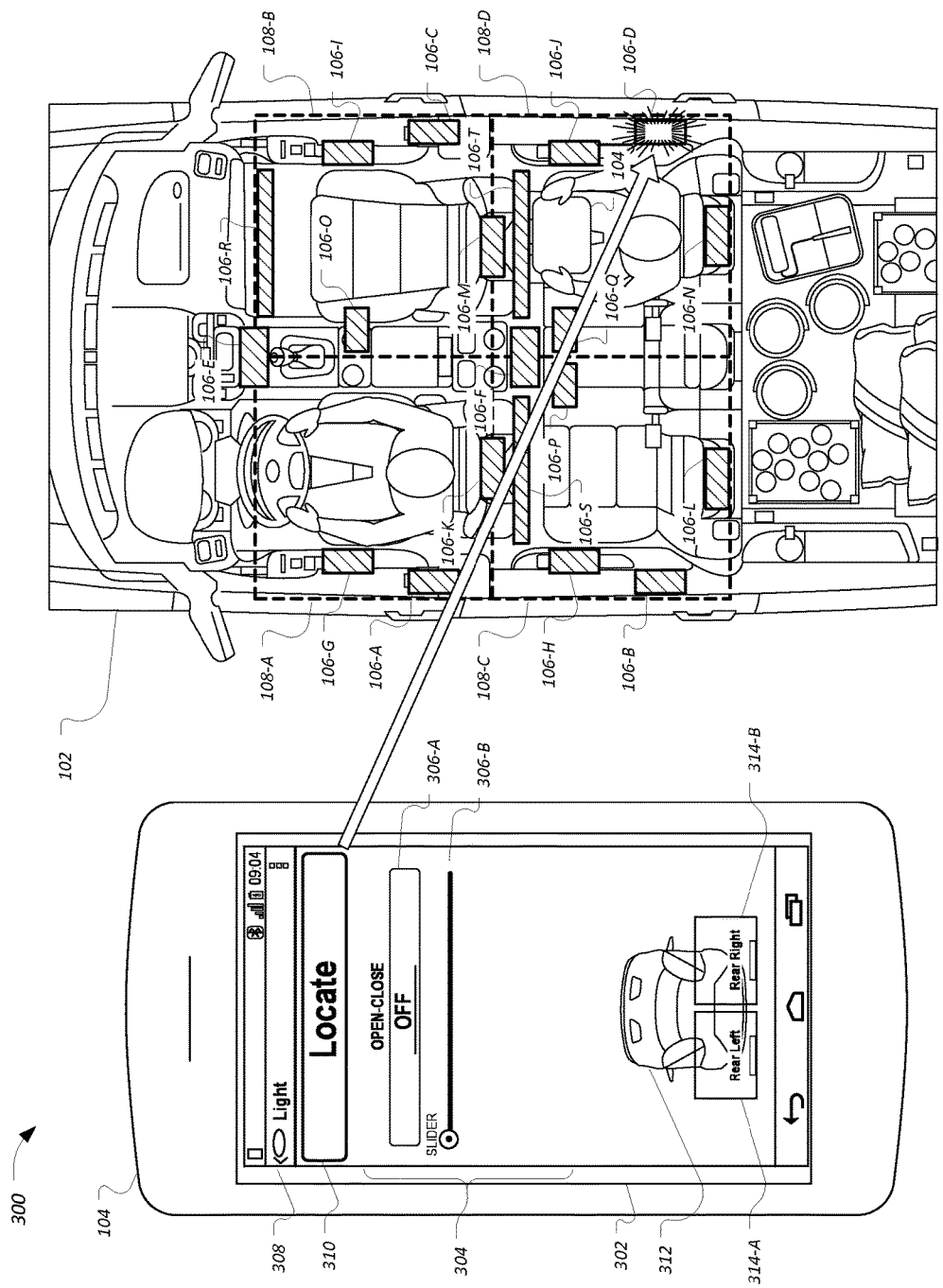
FIG. 3 illustrates an example diagram of the personal device of the occupant requesting backlighting of a specific in-vehicle component using the vehicle component interface application.

FIG. 3 illustrates an example diagram 300 of the personal device 104 of the occupant requesting backlighting of a specific in-vehicle component 106 using the vehicle component interface application 118. In an example, the user interface 302 may be displayed responsive to user input to an entry 206 in the user interface 202 (e.g., the light entry 206-B) to invoke the user interface 302 for the in-vehicle controls 106 of the selected family that are located in the user's zone 108 (e.g., the zone 108-D as shown).

As shown, the user interface 302 includes a listing 304 configured to display selectable controls 306-A and 306-B (collectively 306) based on the identified in-vehicle components 106 features. Each of the selectable controls 306 may indicate a function of the indicated in-vehicle component 106 that is available for configuration by the user. The user interface 302 may also include the title label 308 to indicate to the user that the user interface 302 is displaying a menu of functions of the indicated in-vehicle component 106. In some cases, when the title label 308 is selected the user interface 302 may revert back to the user interface 202, allowing the user to return to the listing of currently active in-vehicle components 106.

As illustrated, the listing 304 includes a control 306-A for toggling on and off the light of the in-vehicle component 106 and a control 306-B for specifying an intensity of the light in-vehicle component 106. The listing 304 may also provide for scrolling in cases where there are more controls 306 that may be visually represented in the user interface 302 at one time. In some cases, the control 306 may be displayed on a touch screen such that the user may be able to touch the controls 306 to make adjustments to the functions of the in-vehicle component 106. As another example, the user interface 302 may support voice commands. For example, to toggle the light on, the user may speak the voice command "LIGHT ON," or simply "ON." It should be noted that the illustrated controls 306 are merely examples, and more or different functions or layouts of functions of the in-vehicle component 106 may be utilized.

It should be noted that while the controls 306 of the user interface 302 include a toggle switch used to turn the light on and off, and a slider to adjust intensity, the actual physical in-vehicle component 106 may have a different user interface. For instance, the in-vehicle component 106 may include a simpler user interface, such as a single mechanical or proximity switch to turn the light on and off, so the occupant would not have to depend on possession of a personal device 104 to utilize basic functionality of the in-vehicle component 106.

As indicated in the diagram 300, the user interface 302 may further includes a component locate control 310 in the user interface 202 of the personal device 104 that, when selected, allows the occupant to selectively invoke the notification devices 120 of an individual in-vehicle component 106 or family of in-vehicle component 106. As further shown, the notification device 120 of the in-vehicle component 106-D is being triggered responsive to user selection of the component locate control 310 of the user interface 302 of the vehicle component interface application 118. As the user chooses to do so, any other notification devices 120 active in the zone 108 may be deactivated. Accordingly, the occupant may be able to use the component locate control 310 to easily identify specific in-vehicle components 106.

In some examples, the user interface 302 may further include a zone interface 312 to select additional in-vehicle components 106 that are available inside the vehicle 102 within different zones 108. As one possibility, the zone interface 312 may include a control 314-A for selection of a driver-side rear zone 108-C, and a control 314-B for selection of a passenger-side rear zone 108-D (collectively controls 314). Responsive to selection of one of the controls 314, the user interface 302 may accordingly display the controls 314 of corresponding in-vehicle component 106 for the selected zone 108. For instance, if the light controls in the zone 108-D is currently being displayed and the user selects the control 314-A to display the corresponding control for the zone 108-C, the user interface 302 may display the functions of the light control for the zone 108-C.

Figure 4:
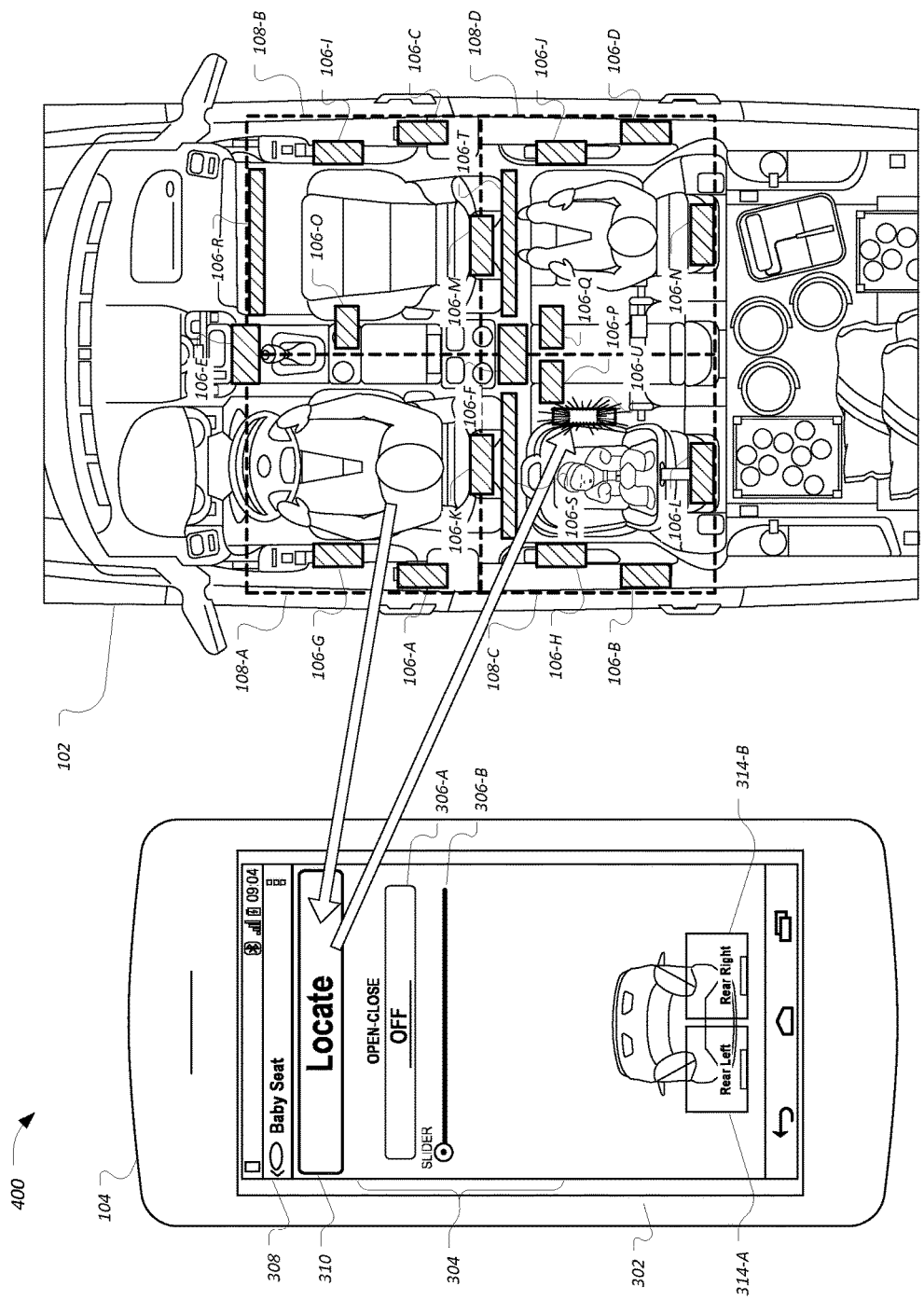
FIG. 4 illustrates an example diagram of the personal device of the occupant requesting backlighting of a specific in-vehicle component located in another zone using the vehicle component interface application.

FIG. 4 illustrates an example diagram 400 of the personal device 104 of the occupant requesting backlighting of a specific in-vehicle component 106 located in another zone 108 using the vehicle component interface application 118. In an example, the component locate control 310 may support an additional action to invoke the notification devices 120 of in-vehicle components 106 located within other zones 108 of the vehicle 102. In an example, when the vehicle component interface application 118 receives a double tap action to the component locate control 310 of the user interface 302, the vehicle component interface application 118 may activate the notification devices 120 of the in-vehicle components 106 located within the other zones 108.

As an example, if a front seat vehicle occupant does not want to be distracted by directly managing functions on a baby car seat in-vehicle component 106-U located in the rear of the vehicle 102, the front seat occupant may utilize his or her personal device 104 to activate the notification devices 120 of the baby seat in-vehicle component 106-U. A rear seat vehicle occupant may accordingly identify the highlighted in-vehicle component 106 controls, and physically manage the configuration of the baby car seat in-vehicle component 106-U. For instance, the baby seat in-vehicle component 106-U functions such as vibration, lighting and music may be highlighted.

Figure 5:
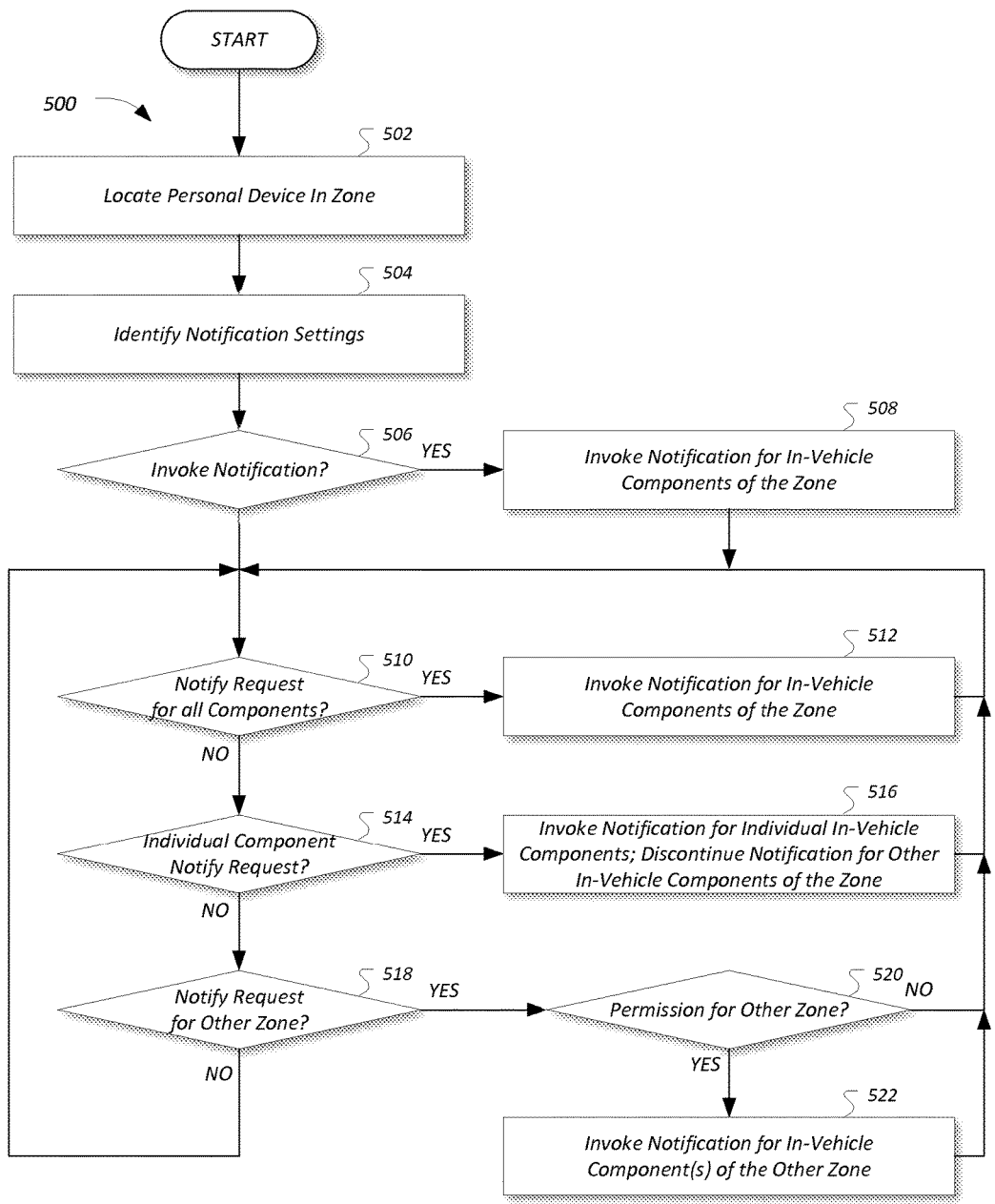
FIG. 5 illustrates an example process for utilizing the backlighting of the in-vehicle components to indicate the locations of the in-vehicle components.

FIG. 5 illustrates an example process 500 for utilizing the backlighting of the in-vehicle components 106 to indicate the locations of the in-vehicle components 106. In an example, the process 500 may be performed by the personal device 104 in communication with the in-vehicle components 106 of the system 100

At operation 502, the system 100 determines the zone 108 of the vehicle 102 in which the personal device 104 is located. The system 100 may utilize the signal strength 116 information available in communications between wireless transceivers 110 of the in-vehicle components 106 and the wireless transceiver 112 of the personal device 104 to determine the zone 108 in which the personal device 104 is located. As an example, an in-vehicle component 106 may broadcast or otherwise send a request for signal strength 116 to other in-vehicle components 106 of the vehicle 102, and may determine the location of the personal device 104 using one of various lateration techniques, such as one or more of the techniques discussed above. As another example, the personal device 104 may determine its zone 108 based on the signal strength 116 information between the personal device 104 and the in-vehicle components 106. After operation 502, control passes to operation 504.

At operation 504, the system 100 identifies the notification settings 122. In an example, the notification settings 122 may be retrieved from storage of the personal device 104. In other examples, the notification settings 122 may be retrieved from storage of the in-vehicle components 106 or another vehicle 102 component. The notification settings 122 may specify whether or not to perform notifications, as well as aspects of the notification, such as a predetermined amount of time during which the notification devices 120 are activated. In some cases, the notification settings 122 may indicate for the notification to be performed the first time that a user enters a vehicle 102, while in other cases, the notification settings 122 may indicate for the notification to be performed each time the user enters a vehicle 102. After operation 504, control passes to operation 506.

At operation 506, the system 100 determines whether to invoke notification devices 120 of the in-vehicle components 106 of the zone 108. In an example, if the notification settings 122 specify to perform a notification, control passes to operation 508. In another examine, if the notifications settings specify to perform notification the first time that the user enters a vehicle 102, and the personal device 104 or the in-vehicle components 106 identify that the personal device 104 has not been in the vehicle 102 (or vehicle zone 108) before, control passes to operation 508. In other examples, control passes to operation 510.

At operation 508, the system 100 invokes the notification devices 120 of the in-vehicle components 106 of the zone 108. In an example, the notification devices 120 may include backlights, and the notification devices 120 may be invoked to backlight the in-vehicle components 106 of the zone 108 in which the personal device 104 is located. After operation 508, control passes to operation 510.

At operation 510, the system 100 determines whether to invoke notification devices 120 of the in-vehicle components 106 of the zone 108. In an example, the vehicle component interface application 118 may receive a selection of the locate control 210 of the user interface 202 displayed by the vehicle component interface application 118 to a display of the personal device 104. If the system 100 determines to invoke the notification devices 120, control passes to operation 512. Otherwise, control passes to operation 514.

At operation 512, and similar to discussed above with respect to the operation 508, the system 100 invokes the notification devices 120 of the in-vehicle components 106 of the zone 108. After operation 512, control passes to operation 510.

At operation 514, the system 100 determines whether to invoke the notification device 120 of a specific in-vehicle component 106 or family of in-vehicle components 106 of the zone 108. In an example, the vehicle component interface application 118 may receive a selection of the component locate control 310 of the user interface 302 displayed by the vehicle component interface application 118 to a display of the personal device 104. If the system 100 determines to invoke the notification device 120, control passes to operation 516. Otherwise, control passes to operation 510.

At operation 516, the system 100 invokes the notification devices 120 of the specific in-vehicle component(s) 106 of the zone 108. The system 100 may further discontinue notifications currently being provided from any other in-vehicle components 106 within the zone 108. After operation 516, control passes to operation 510.

At operation 518, the system 100 determines whether to invoke one or more notification devices 120 of in-vehicle components 106 of another zone 108. In an example, the vehicle component interface application 118 may receive a selection from the zone interface 312 to select additional in-vehicle components 106 that are available inside the vehicle 102 within a different zone 108. For the other zone 108, the vehicle component interface application 118 may receive selection of the locate control 210 of the user interface 202 to request notification for all in-vehicle components 106 of the other zone 108, or selection of the component locate control 310 of the user interface 302 202 to request notification for a particular in-vehicle components 106 or family of in-vehicle components 106 of the other zone 108.

At operation 520, the system 100 determines whether the user has permission for the other zone 108. For example, a personal device 104 of a passenger sitting in a rear row may not have, by default, permission to request a notification for an in-vehicle component 106 located in the driver zone 108-A. On the other hand, a personal device 104 located in the driver zone 108-A or front passenger zone 108-B may have, by default, permission to request notification for an in-vehicle component 106 located in the rear zones 108 (e.g., the zones 108-C and 108-D in an example). These default permissions could be changed by the driver when the vehicle 102 is not in motion.

At operation 522, the system 100 the system 100 invokes the notification devices 120 of the in-vehicle component(s) 106 of the other zone 108 as requested. As one example, and similar to as described above with respect to operations 508 and 512 of the process 500, the system 100 invokes the notification devices 120 of the in-vehicle components 106 of the other zone 108. As another example, and similar to as described with respect to operation 516, the system 100 may invokes the notification devices 120 of the specific in-vehicle component(s) 106 of the other zone 108. After operation 522, control passes to operation 510.

Thus, the system 100 may allow vehicle 102 occupants to locate in-vehicle components 106 with vehicle 102. As the occupant may be unfamiliar with the vehicle 102, the described systems 100 and methods offer a convenient way for users to discover available functionality. For instance, the occupant may discover functionality specific to a zone 108 as the occupant enters the vehicle 102, the occupant may locate all available functions or just a specific functions of the occupant's current zone 108, and may allow the occupant to help a fellow occupant locate in-vehicle components 106 in the other occupant's own zone 108.

Computing devices described herein, such as the personal devices 104 and in-vehicle components 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the features of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   in-vehicle components, each associated with at least one zone associated with a respective seating position of a vehicle, wherein the in-vehicle components include at least one vehicle interior light or vehicle interior speaker; and
   a processor programmed to
   locate a personal device as being within one of the zones;
   identify notification settings of the personal device; and
   invoke notification devices of the in-vehicle components associated with the zone when the notification settings indicate that the personal device has not been previously located in the zone, wherein the notification device of the light or speaker is configured to activate lighting of the light or audible elements of the speaker to facilitate identification of a physical location of the light or speaker within the vehicle.

2. The system of claim 1, wherein the notification devices of the in-vehicle components include at least one of backlights of the in-vehicle components, lighting elements of the in-vehicle components, haptic feedback devices of the in-vehicle components or audio feedback devices of the in-vehicle components.

3. The system of claim 1, wherein the processor is a processor of the personal device.

4. The system of claim 1, wherein the processor is a processor of one of the in-vehicle components.

5. The system of claim 1, wherein the processor is further programmed to:
receive a notify request for all modules within the zone; and
invoke the notification devices of the in-vehicle components of the zone responsive to the notify request.

6. The system of claim 1, wherein the processor is further programmed to discontinue notification from the notification devices in accordance with a time period specified by the notification settings.

7. The system of claim 1, wherein the processor is further programmed to:
receive a notify request for a specific in-vehicle component within the zone; and
invoke notification for the specific in-vehicle component of the zone responsive to the notify request while discontinuing notification for all other in-vehicle components of the zone.

8. A computer-implemented method comprising:
locating a personal device within one of a plurality of zones defined as respective seating positions of a vehicle, each zone including at least one in-vehicle component;
displaying a user interface to the personal device describing the in-vehicle components of the zone;
receiving a notify request from the user interface;
invoking notification devices of at least one of the in-vehicle components of the zone responsive to the notify request;
receiving a second notify request from the user interface to invoke notification devices of at least one in-vehicle component of a second zone other than the zone; and
invoking the notification devices of the at least one in-vehicle component of the second zone responsive to the second notify request.

9. The method of claim 8, wherein the notify request is a request to locate all in-vehicle components included within the zone, and further comprising invoking the notification devices for all the in-vehicle components included within the zone responsive to the notify request.

10. The method of claim 8, wherein the notify request is a request to locate a specific in-vehicle component included within the zone, and further comprising invoking notification for the specific in-vehicle component of the zone responsive to the notify request while discontinuing notification for all other in-vehicle components of the zone.

11. The method of claim 8, further comprising discontinuing notification from the notification devices in accordance with a time period specified by notification settings of the personal device.

12. The method of claim 8, further comprising displaying the user interface to the display of the personal device responsive to locating the personal device as being within the one of the plurality of zones.

13. The method of claim 8, wherein invoking notification devices includes invoking at least one of backlights or lighting elements of the at least one of the in-vehicle components of the zone.

14. The method of claim 8, wherein invoking notification devices includes invoking at least one of haptic feedback devices or audio feedback devices of the at least one of the in-vehicle components of the zone.

15. The method of claim 8, further comprising, responsive to locating the personal device as being within the one of the plurality of zones, invoking the notification devices when notification settings indicate that the personal device has not been previously located in the zone.

16. A non-transitory computer-readable medium including instructions that, when executed by a processor, cause the processor to:
locate a personal device within one of a plurality of zones defined as respective seating positions of a vehicle, each zone including at least one in-vehicle component, wherein the in-vehicle components include at least one vehicle interior light or vehicle interior speaker;
identify notification settings of the personal device; and
invoke notification devices of the in-vehicle components associated with the zone when the notification settings indicate that the personal device has not been previously located in the zone, wherein the notification device of the light or speaker is configured to activate lighting of the light or audible elements of the speaker to facilitate identification of a physical location of the light or speaker within the vehicle.

17. The medium of claim 16, further including instructions that cause the processor to:
receive a notify request for all modules within the zone; and
invoke the notification devices of the in-vehicle components of the zone responsive to the notify request.

18. The medium of claim 16, further including instructions that cause the processor to discontinue notification from the notification devices in accordance with a time period specified by notification settings.

19. The medium of claim 16, further including instructions that cause the processor to:
receive a notify request for a specific in-vehicle component within the zone; and
invoke notification for the specific in-vehicle component of the zone responsive to the notify request while discontinuing notification for all other in-vehicle components of the zone.

20. A method comprising:
locating a personal device as within one of a plurality of seating zones of a vehicle; arid
invoking notification devices of in-vehicle components included within the zone by activating lighting elements of lights in the zone or audible elements of speakers in the zone when notification settings of the personal device indicate that the personal device has not been previously located in the zone.

* * * * *

UNITED STATES PATENT AND TRADEMARK OFFICE
CERTIFICATE OF CORRECTION

PATENT NO. : 9,914,418 B2  
APPLICATION NO. : 14/842025  
DATED : March 13, 2018  
INVENTOR(S) : Pietro Buttolo et al.

Page 1 of 1

It is certified that error appears in the above-identified patent and that said Letters Patent is hereby corrected as shown below:

In the Claims

Column 14, Line 54:  
After "*seating zones of a vehicle;*"  
Delete "*arid*" and insert --*and*--

Signed and Sealed this  
Seventeenth Day of April, 2018

Andrei Iancu  
*Director of the United States Patent and Trademark Office*